United States Patent
Ruknudeen et al.

(10) Patent No.: US 9,212,953 B2
(45) Date of Patent: Dec. 15, 2015

(54) HEALTH MONITORING OF LIGHTS

(75) Inventors: Fazludeen Ruknudeen, Bangalore (IN); Vasuki Prasad, Bangalore (IN)

(73) Assignee: Honeywell International Inc., Morristown, NJ (US)

( * ) Notice: Subject to any disclaimer, the term of this patent is extended or adjusted under 35 U.S.C. 154(b) by 487 days.

(21) Appl. No.: 13/612,261

(22) Filed: Sep. 12, 2012

(65) Prior Publication Data

US 2014/0072013 A1    Mar. 13, 2014

(51) Int. Cl.
*G01R 31/02* (2006.01)
*G01K 7/01* (2006.01)
*H05B 33/08* (2006.01)

(52) U.S. Cl.
CPC .............. *G01K 7/01* (2013.01); *H05B 33/0893* (2013.01)

(58) Field of Classification Search
CPC ... G01R 31/2635; G01K 7/01; H05B 33/0893
USPC ...................... 324/762.07, 403–414
See application file for complete search history.

(56) References Cited

U.S. PATENT DOCUMENTS

| | | | |
|---|---|---|---|
| 2002/0097000 A1* | 7/2002 | Muthu et al. | 315/169.3 |
| 2003/0015973 A1* | 1/2003 | Ovens et al. | 315/291 |
| 2004/0108982 A1* | 6/2004 | Krohn | 345/82 |
| 2005/0206529 A1* | 9/2005 | St.-Germain | 340/815.45 |
| 2006/0028155 A1* | 2/2006 | Young | 315/308 |
| 2007/0040696 A1* | 2/2007 | Mubaslat et al. | 340/657 |
| 2010/0327872 A1* | 12/2010 | Chen et al. | 324/414 |
| 2011/0006919 A1* | 1/2011 | Lundberg et al. | 340/963 |
| 2011/0115383 A1* | 5/2011 | Tyson et al. | 315/120 |
| 2011/0299068 A1* | 12/2011 | Glandt et al. | 356/218 |
| 2012/0001552 A1* | 1/2012 | Tsai et al. | 315/129 |
| 2012/0169345 A1* | 7/2012 | Wang et al. | 324/414 |
| 2012/0299492 A1* | 11/2012 | Egawa et al. | 315/192 |

OTHER PUBLICATIONS

Sumita, et al. "Analysis of EOL Prediction Methodology for Triple-Junction Solar Cells in Actual Radiation Environment", IEEE, Issue Date: Jan. 3-7, 2005 (4 pgs).

* cited by examiner

*Primary Examiner* — Jermele M Hollington
*Assistant Examiner* — Demetrius Pretlow
(74) *Attorney, Agent, or Firm* — Brooks, Cameron & Huebsch, PLLC

(57) ABSTRACT

The present disclosure provides methods, devices, and computer-readable media for health monitoring of lights. One or more embodiments include receiving data, including a junction temperature of a light emitting diode (LED), an ambient temperature, and a drive current associated with the LED, receiving a pre-existing LED performance data set, and determining an end of life of the LED based on the junction temperature of the LED, the ambient temperature, the drive current associated with the LED, and the pre-existing LED performance data set.

20 Claims, 3 Drawing Sheets

HEALTH MONITORING OF LIGHTS

TECHNICAL FIELD

The present disclosure relates to methods, systems, and computer-readable media for health monitoring of lights.

BACKGROUND

Lights can be used for purposes such as illumination and marking. For example, lights can be used to illuminate areas for security purposes and/or lights can be used to mark runways, taxiways, and/or approaches at an airport. Lights used to mark runways, taxiways, and/or approaches can operate using halogen bulbs and/or light emitting diodes. Light emitting diodes can offer advantages over halogen bulbs, such as extended life and/or reduced energy usage.

The extended life associated with an LED can reduce maintenance costs associated with purchasing new lights as well as labor associated with replacing lights that have burned out. However, LED lights can still fail, which can cause safety concerns such as when the LED is used to mark a runway, taxiways, and/or approaches at an airport. As such, replacing the LED before a failure occurs can be of importance when ensuring that an airfield is safe for use by aircraft.

DETAILED DESCRIPTION

Figure 1:
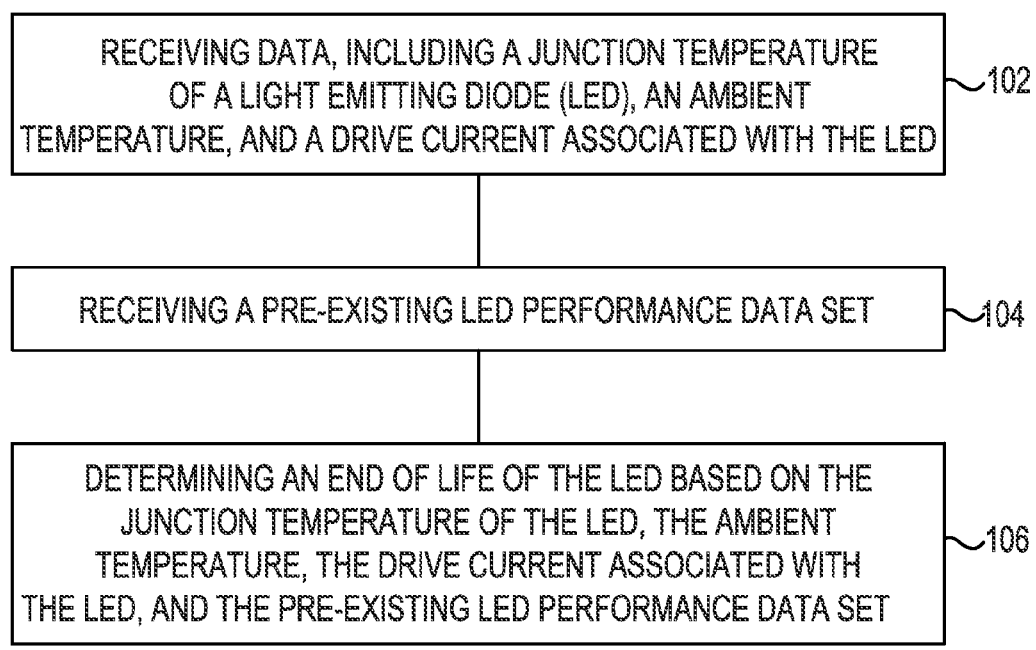
FIG. 1 illustrates a method for health monitoring of lights according to one or more embodiments of the present disclosure.

The present disclosure provides methods, devices, and computer-readable media for health monitoring of lights. One or more embodiments include receiving data, including a junction temperature of a light emitting diode (LED), an ambient temperature, and a drive current associated with the LED, receiving a pre-existing LED performance data set, and determining an end of life of the LED based on the junction temperature of the LED, the ambient temperature, the drive current associated with the LED, and the pre-existing LED performance data set.

An average service life of a halogen lamp can be approximately 2000 hours. It can be a customary practice to replace the halogen lamps periodically after, for example, 1,000 hours of service. This can minimize the sudden failure of any lamp during operation.

Provided the thermal design of an LED is adequate, LEDs can rarely incur a failure in which a light output from the LED ceases. LEDs can be more likely to have a gradual decay in light intensity. This can provide a possibility of determining an end of life of an LED. Halogen lamps can be replaced periodically irrespective of their health. As such, the higher lifetime of LEDs can result in savings, even if the LEDs are replaced periodically irrespective of their health. However, determining the end of life of the LED can result in a further increase in savings.

Some embodiments of the present disclosure can provide for an accurate calculation of an end of life of an LED. As used herein, the end of life of the LED can be defined as a failure of the LED, resulting in no light being produced by the LED, and/or a reduction in light produced by the LED to a defined point. For example, light produced by the LED can be reduced to a point (e.g., 70% of initial light output from the LED).

Currently, some solutions can collect data for an LED to try and predict the end of life of the LED. However, the data can be based on the theoretical prediction or accelerated lab tests in controlled environments. As such, the end of life data for LEDs that operate under actual working conditions can vary greatly from the theoretical predictions and accelerated lab tests, thus leading to an inaccurate prediction of the end of life of the LED.

Some embodiments of the present disclosure can use a pre-existing LED performance data set and actual operating parameters (e.g., junction temperature, ambient temperature, drive current, photometric data) from the LED to accurately calculate the end of life of the LED. In an example, the data can be received along with the pre-existing LED performance data set and can be used to calculate the end of life of the LED.

In the following detailed description of the present disclosure, reference is made to the accompanying drawings that form a part hereof, and in which is shown by way of illustration how one or more embodiments of the disclosure may be practiced. These embodiments are described in sufficient detail to enable those of ordinary skill in the art to practice the embodiments of this disclosure, and it is to be understood that other embodiments may be utilized and that process, electrical, and/or structural changes may be made without departing from the scope of the present disclosure.

As will be appreciated, elements shown in the various embodiments herein can be added, exchanged, and/or eliminated so as to provide a number of additional embodiments of the present disclosure. In addition, as will be appreciated, the proportion and the relative scale of the elements provided in the figures are intended to illustrate the embodiments of the present disclosure, and should not be taken in a limiting sense.

As used herein, "a" or "a number of" something can refer to one or more such things. For example, "a number of differences" can refer to one or more differences.

FIG. 1 illustrates a method for health monitoring of lights according to one or more embodiments of the present disclosure. The method can be performed by, for example, the device further described herein in connection with FIG. 3.

At block 102, the method includes receiving data, including a junction temperature of a light emitting diode (LED), an ambient temperature, and a drive current associated with the LED. The junction temperature can be defined as the highest temperature of the actual semiconductor in the LED. The ambient temperature can be defined as a temperature within an enclosure containing the LED. Alternatively, and/or in addition, the ambient temperature can be defined as an outside air temperature. In an example, the outside air temperature can be measured proximate to the LED enclosure. The drive current associated with the LED can be defined as the current flow associated with the operation of the LED.

In an example, the junction temperature, the ambient temperature, and/or the drive current can vary. For example, as a result of a change in the ambient temperature, the junction temperature can change. An increase in the ambient temperature can cause an increase in junction temperature, which can cause a reduction in a life of the LED. A decrease in the ambient temperature can cause a decrease in junction temperature, which can cause an increase in a life of the LED.

Alternatively, and/or in addition, a change in the drive current can cause a change in junction temperature and a resulting change to the life of the LED. For example, an increase in the drive current can cause an increase in junction temperature, which can cause a reduction in a life of the LED. A decrease in the drive current can cause a decrease in junction temperature, which can cause an increase in a life of the LED.

Light designers can quote the same lifetime numbers that LED manufacturers quote for the life of individual LEDs used in a lighting system. These numbers, however, can be based on data collected under certain laboratory conditions. For example, the data can be collected under laboratory conditions that are constant. For instance, an LED can be run at a first junction temperature, first ambient temperature, and first drive current and data associated with the life of the LED can be collected. The LED can also be run at a second junction temperature, second ambient temperature, and second drive current and data associated with the life of the LED can be collected. However, since an LED can be operated at nearly any combination of junction temperature, ambient temperature, and drive current, it may not be possible to calculate the life of the LED for every combination.

In reality, however, LEDs in a system can degrade at a much different rate depending on how the LEDs are packaged and powered, as well as the environmental conditions in which the LED is operated. As discussed herein, LED manufactures can generate numbers associated with the life of LEDs based on set conditions. For instance, an LED can be operated at a constant junction temperature, constant ambient temperature, and constant drive current to determine data for the end of life of the LED.

However, the actual conditions that exist during operation of the LED can vary. For example, the junction temperature can vary based on changes in the drive current and/or ambient temperature. As a result, the LED may encounter many different junction temperatures, ambient temperatures, and drive currents. As such, it can be challenging to accurately predict end of life data for an LED based on the manufacturer's quote for the life of LEDs.

In an example, the ambient temperature can be measured by a temperature sensor located within the enclosure containing the LED. Alternatively, and/or in addition, the temperature sensor can be located outside of the enclosure containing the LED in the ambient air. In an example, when the temperature sensor is located outside of the enclosure, the temperature sensor can be located proximate to the enclosure.

The method includes, at block 104, receiving a pre-existing LED performance data set. The pre-existing LED performance data set can be provided by a manufacturer of the LED and can be a graph associated with the LED performance that contains data points related to the life of an LED and/or can be the data points that can be used to form the graph associated with the LED performance. Alternatively, and/or in addition, the pre-existing LED performance data set can be generated through experiments.

In an example, the pre-existing LED performance data set can be a graph containing data points related to the life of an LED. The life of the LED can be measured in terms of light intensity of the LED and can be defined as a point in which a luminous intensity reaches a defined level. For example, the life of the LED can be defined as a point in which the luminous intensity reaches seventy percent of its initial value.

In an example, the life of the LED (e.g., hours) can be graphed at a constant drive current versus the junction temperature for various ambient temperatures. Alternatively, and/or in addition, the life of the LED can be graphed at a constant ambient temperature versus the junction temperature for various drive currents, for example.

In some embodiments, the method can include determining an LED life from the pre-existing performance data set. In an example, the LED life can be determined from given data in the pre-existing performance data set. For instance, when determining the LED life from the pre-existing performance data set, the LED can be assumed to operate at constant parameters, such as a constant junction temperature, constant drive current, and/or constant ambient temperature. In an example, the LED can be assumed to operate at 490 milliamps (mA) with a junction temperature of 90 degrees Celsius (° C.) at an ambient temperature of 65° C. Using these values, the LED life determined from the pre-existing performance data set can be determined to be 73,746 hours, in an example.

The assumed operating conditions of the LED can be based off of historical operating conditions associated with a previous LED in an example. Alternatively, and/or in addition, upon installation of the LED, the operating conditions of the LED can be recorded for a defined time period (e.g., an hour, day, week) and an average of the operating conditions can be determined. The average of the operating conditions can then be used to determine the LED life from the pre-existing performance data set.

Some embodiments can include determining an LED performance equation from the pre-existing LED performance data set. In an example, the pre-existing LED performance data set can be extracted from an LED performance graph. As discussed herein, the LED performance graph can be provided by the manufacturer of the LED and/or generated through experiments. Determination of the LED performance equation can be performed by extracting data points from the LED performance graph and/or through use of the data points that form the graph associated with the LED performance.

In an example, data points associated with a first graph illustrating the life of the LED at a constant drive current versus the junction temperature for various ambient temperatures can be extracted and the data can be processed and the various ambient temperatures can be factored into the processed data. For example, data points can be averaged to determine an average over the various ambient temperatures.

Alternatively, and/or in addition, data points from a second graph illustrating the life of the LED at a second constant drive current versus the junction temperature for the various ambient temperatures can then be extracted and the data can be processed and the various ambient temperatures can be factored in to the processed data. For example, data points can be averaged to determine the average over the various ambient temperatures. This can be done repeatedly for numerous graphs associated with constant drive currents.

The data points associated with the first drive current and the second drive current can then be collected and/or graphed on a third graph, in an example. Methods such as interpolation can then be used to determine data points located between the data points from the first and second graphs. As such, data points associated with numerous drive currents can be determined.

For instance, the third graph can originally consist of a line and/or curve associated with the first drive current and the second drive current. However, after interpolation, a greater number (e.g., 10, 100) of lines and/or curves and data points associated with those lines can be determined.

In some embodiments, the LED performance equation can be fit to the data points associated with the first drive current and the second drive current. Alternatively, and/or in addition, the LED performance equation can be fit to the interpolated data extracted from the LED performance graph.

Some embodiments can include determining an LED life from the junction temperature of the LED, the ambient temperature, and the drive current associated with the LED based on the LED performance equation. In an example, the junction temperature of the LED, the ambient temperature, and/or the drive current associated with the LED, which the LED performance equation is based on, can be plugged into the LED performance equation. As such, the LED life associated with the actual operation parameters of the LED can be determined.

The method includes determining an end of life of the LED based on the junction temperature of the LED, the ambient temperature, the drive current associated with the LED, and the pre-existing LED performance data set, at block 106. In an example, the end of life of the LED can be determined through an end of life equation:

$$L = L_0 - \sum_{J_c,i,T_a} \frac{L_0}{L_{J_c,i,T_a}} t_{J_c,i,T_a}$$

where L represents the end of life of the LED, $L_0$ is the life of the LED determined from the pre-existing LED performance data set, $L_{J_c,i,T_a}$ is the life of the LED determined from the junction temperature of the LED, the ambient temperature, and the drive current associated with the LED based on the LED performance equation, and $t_{J_c,i,T_a}$ is the time elapsed when operating the LED at the junction temperature, the ambient temperature, and the drive current. For example, the time elapsed can include the total time the LED has been operated at each junction temperature, ambient temperature, and/or drive current.

in an example, the LED can be operated at multiple currents and/or junction temperatures over the course of the life of the LED. For example, the LED can be run at a current of 490 mA with a junction temperature of 120° C. for 25,000 hours; a current of 525 mA with a junction temperature of 90° C. for 10,000 hours; 700 mA with a junction temperature of 70° C. for 200 hours; and 700 mA with a junction temperature of 150° C. for 8,000 hours. Using the end of life equation, as discussed herein, the end of life for the LED can be computed for each drive current and temperature combination, which are then summed to determine the end of life of the LED. Summing each run time at each current and junction temperature, the actual time elapsed when operating the LED at the junction temperature, the ambient temperature, and the drive current ($t_{J_c,i,T_a}$) is 43,200 hours. In an example, using the assumption discussed herein regarding operation of the LED, the LED can be assumed to operate at 490 milliamps (mA) with a junction temperature of 90 degrees Celsius (° C.) at an ambient temperature of 65° C. Using these values, the LED life ($L_0$) can be determined to be 73,746 hours, in an example.

However, the sum of $$\frac{L_0}{L_{J_c,i,T_a}} t_{J_c,i,T_a}$$

is 72,853 hours, which can be the calculated time of operation of the LED at the current junction temperature, ambient temperature, and drive current. As such, the difference between the LED life and the calculated time of operation of the LED at the current junction temperature, ambient temperature, and drive current can be determined, which is 893 hours. As such, the end of life for the LED can be calculated to occur within 893 hours.

In some embodiments, the method can include receiving photometric data from the LED and calculating the end of life of the LED based on the received photometric data. In an example the photometric data can include a luminous flux, luminous intensity, and/or light emission spectrum. The photometric data can be collected by a sensor located in the enclosure containing the LED.

In an example, collecting the photometric data from a sensor located inside of the enclosure can increase an accuracy of the photometric data and the resulting calculation of the end of life of the LED. For instance, the sensor can be located within a close proximity of the LED and inside of an enclosure, thus protecting the sensor from the elements, rain, snow, particulate matter, and/or wind, which may cause the sensor to become dirty and/or malfunction. Alternatively, and/or in addition, placement of the sensor within the enclosure can prevent rain, snow, and/or particulate matter from entering a path between the LED and the photometric sensor, thus preventing the light generated by the LED from entering the photometric sensor, providing inaccurate results.

In some embodiments, the end of life of the LED can be calculated based on the photometric data, as discussed herein. For example, as the LED is operated, the luminous flux associated with light generated by the LED can be reduced, which can be due to a yellowing of epoxy on the semiconductor and/or degradation of the semiconductor. As such, a correlation between the reduction in luminous flux and the end of life of the LED can be made, which can be used for the determination of the end of the life of the LED.

In some embodiments, the method can include transmitting at least one of the junction temperature of the LED, the ambient temperature, the drive current associated with the LED, the photometric data, and/or the end of life of the LED to a collection station. In an example, the collection station can include an interface, which can display the at least one of the junction temperature of the LED, the ambient temperature, the drive current associated with the LED, the photometric data, and/or the end of life of the LED. Alternatively, and/or in addition, the collection station can calculate the end of life of the LED from the at least one of the junction temperature of the LED, the ambient temperature, the drive current associated with the LED, and/or the photometric data.

In some embodiments, the method can include transmitting the end of life of the LED to a collection station when the end of life reaches a defined value. For example, when the end of life is determined to be within a defined time and/or within a percentage of the initial life, the end of life can be transmitted to the collection station. By transmitting the end of life to the collection station within the defined time, an action can be scheduled for replacement of the LED, for example. For instance, a notification can be displayed indicating that the LED needs to be replaced and/or that the LED needs to be replaced within a defined time.

In some embodiments, the collection station can include a wireless receiver to receive the at least one of the junction temperature of the LED, the ambient temperature, the drive current associated with the LED, the photometric data, and/or the end of life of the LED. In an example, the collection station can be mounted on a vehicle. The vehicle can drive past the LED and the at least one of the junction temperature of the LED, the ambient temperature, the drive current associated with the LED, and the photometric data can be transmitted to the collection station as the collection station passes within a defined range of the LED. For example, when the vehicle passes within 30 feet of the LED, the at least one of the junction temperature of the LED, the ambient temperature, the drive current associated with the LED, the photometric data, and/or the end of life of the LED can be received by the collection station.

In some embodiments, the method can include receiving an instruction to transmit the at least one of the junction temperature of the LED, the ambient temperature, the drive current associated with the LED, the photometric data, and/or the end of life of the LED at a first controller associated with a first LED. For example, the instruction can be received by the controller through a wireless and/or wired connection. The instruction can include an instruction to transmit the at least one of the junction temperature of the LED, the ambient temperature, the drive current associated with the LED, the photometric data, and/or the end of life of the LED to the collection station, in an example.

In some embodiments, the method can include sending the instruction from the first controller associated with the first LED to a second controller associated with a second LED. In an example, the instruction can include an instruction to send the at least one of the junction temperature of the LED, the ambient temperature, the drive current associated with the LED, the photometric data, and/or the end of life of the LED to the first controller and/or the collection station. As such, the method can include receiving, at the first controller associated with the first LED and/or the collection station, the at least one of the junction temperature of the LED, the ambient temperature, the drive current associated with the LED, the photometric data, and/or the end of life of the LED.

In an example, the instruction can continue to be transmitted to controllers associated with LEDs in a chain fashion and upon receipt of the instruction, the at least one of the junction temperature of the LED, the ambient temperature, the drive current associated with the LED, the photometric data, and/or the end of life of the LED can be transmitted in a chain fashion back to a collection station through the controllers associated with the LEDs. Alternatively, and/or in addition, the at least one of the junction temperature of the LED, the ambient temperature, the drive current associated with the LED, the photometric data, and/or the end of life of the LED can be transmitted back to the collection station directly.

In some embodiments, an instruction can be sent directly to and received by each of the controllers associated with each of the LEDs. In an example, the instruction can include an instruction to send the at least one of the junction temperature of the LED, the ambient temperature, the drive current associated with the LED, the photometric data, and/or the end of life of the LED directly to the collection station and/or in a chain fashion through each of the controllers associated with each of the LEDs.

Figure 2:
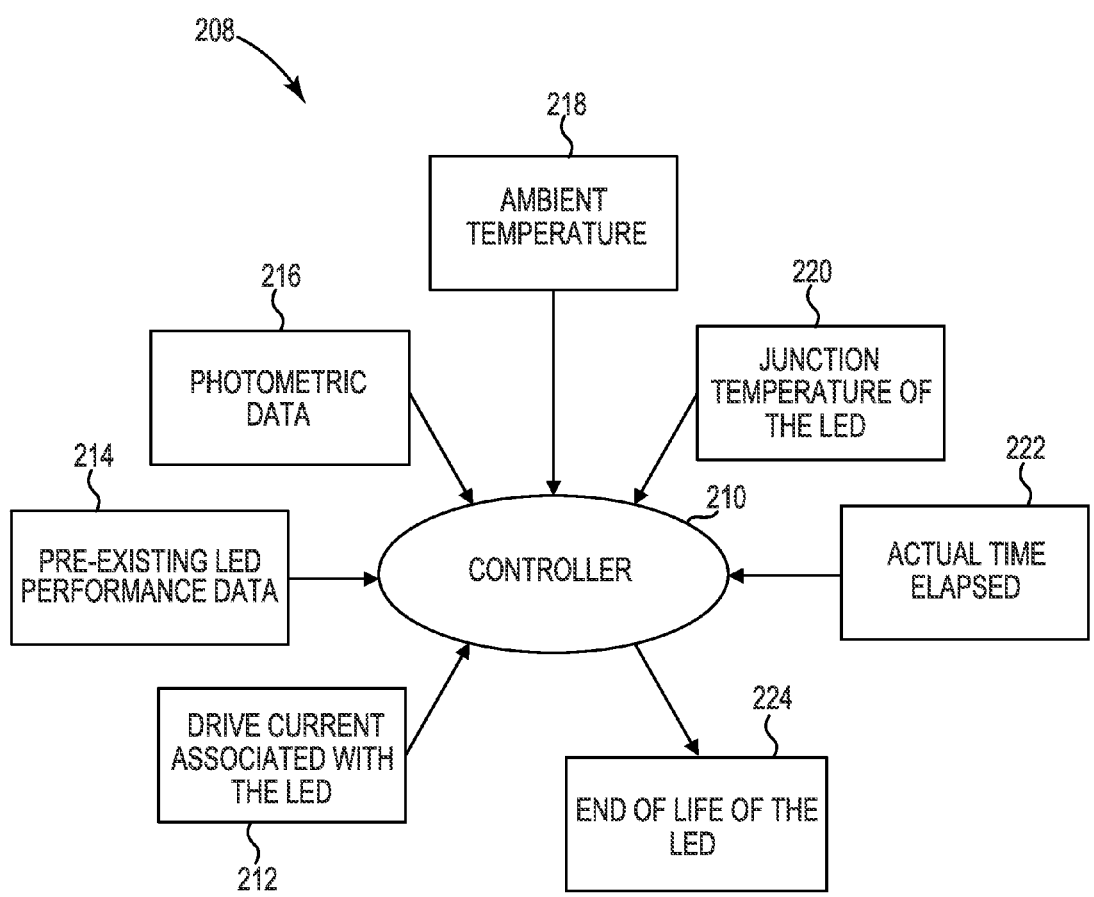
FIG. 2 illustrates a system for health monitoring of lights according to one or more embodiments of the present disclosure.

FIG. 2 illustrates a system 208 for health monitoring of lights according to one or more embodiments of the present disclosure. The system 208 can include a controller 210. The controller can receive data including a drive current associated with the LED 212, pre-existing LED performance data 214, photometric data 216 (e.g., luminous intensity, light emission spectrum), ambient temperature 218, junction temperature of the LED 220, and/or actual time elapsed 222. The controller 210 can determine an end of life of the LED 224.

In an example, the controller 210 can be located proximate to the LED (e.g., in the enclosure containing the LED). Alternatively, and/or in addition, the controller 210 can be located in a position distal to the LED (e.g., within a building).

As discussed herein the pre-existing LED performance data set 214 can be provided by a manufacturer of the LED and can be a graph associated with the LED performance that contains data points related to the life of an LED and/or can be the data points that can be used to form the graph associated with the LED performance. In an example, the pre-existing LED performance data set 214 can be extracted from the LED performance graph.

In an example, the drive current associated with the LED 212 can be measured by a current sensor and received by the controller 210 from the current sensor. In an example, the photometric data 216 can be measured by a photometric sensor and received by the controller 210 from the current sensor. In an example, the ambient temperature 218 can be an ambient temperature for an enclosure containing the LED and can be measured by a temperature sensor and received by the controller 210 from the temperature sensor. The junction temperature of the LED 220 can be measured by a temperature sensor and received by the controller 210 from the temperature sensor.

In an example, the controller 210 can receive an actual time elapsed 222 when operating the LED at the junction temperature of the LED 220, the ambient temperature 218, and the drive current associated with the LED 212. For instance, a clock can be used to measure the actual time elapsed 222 when operating the LED, which can be received by the controller 210 and used for calculating the end of life of the LED 224.

In some embodiments, an LED performance equation can be determined from the pre-existing LED performance data set 214. As discussed herein, the pre-existing LED performance data set 214 can be interpolated from the extracted data from the LED performance graph, in an example.

As discussed herein, the LED performance equation can be a polynomial fit to the interpolated data extracted from the LED performance graph. For example, the LED performance equation can be a third order polynomial fit to the interpolated data extracted from the LED performance graph. In an example, the LED performance equation can be fit to the interpolated data with a program such as Microsoft® Excel.

In some embodiments, as discussed herein, an LED life can be determined from the junction temperature of the LED 220, the ambient temperature 218, and the drive current associated with the LED 212 based on the LED performance equation. In an example, the junction temperature of the LED 220, the ambient temperature 218, and the drive current associated with the LED 212 can be plugged into the LED performance equation and the LED life associated with the actual operation parameters of the LED can be determined.

In some embodiments, an LED life can be determined from the pre-existing LED performance data set 214. In an example, the LED life determined from the pre-existing LED performance data set 214 can be a theoretical time for which the LED should operate at a given junction temperature of the LED 220, ambient temperature 218, and/or drive current associated with the LED 212.

In some embodiments, an end of life of the LED 224 can be determined based on the LED life determined from the junction temperature of the LED 220, the ambient temperature 218, and the drive current associated with the LED 212 and LED life determined from the pre-existing LED performance data set 214. Alternatively, and/or in addition, the end of life of the LED can be determined based on an actual time elapsed 222 when operating the LED at the junction temperature of the LED 220, the ambient temperature 218, and/or the drive current associated with the LED 212.

For example, the end of life of the LED 224 can be determined, as discussed herein, by taking a difference between the LED life determined from the pre-existing LED performance data set 214 and a sum of the LED life determined from the pre-existing LED performance data set 214 divided by the life of the LED determined from the junction temperature of the LED 220, the ambient temperature 218, and the drive current associated with the LED 212, multiplied by the actual elapsed time 22 when operating the LED at the junction temperature of the LED 220, the ambient temperature 218, and/or the drive current associated with the LED 212. In an example, the end of life of the LED 224 can be represented as the amount of time remaining before a luminous intensity of the LED reaches a defined level and/or the LED fails.

Figure 3:
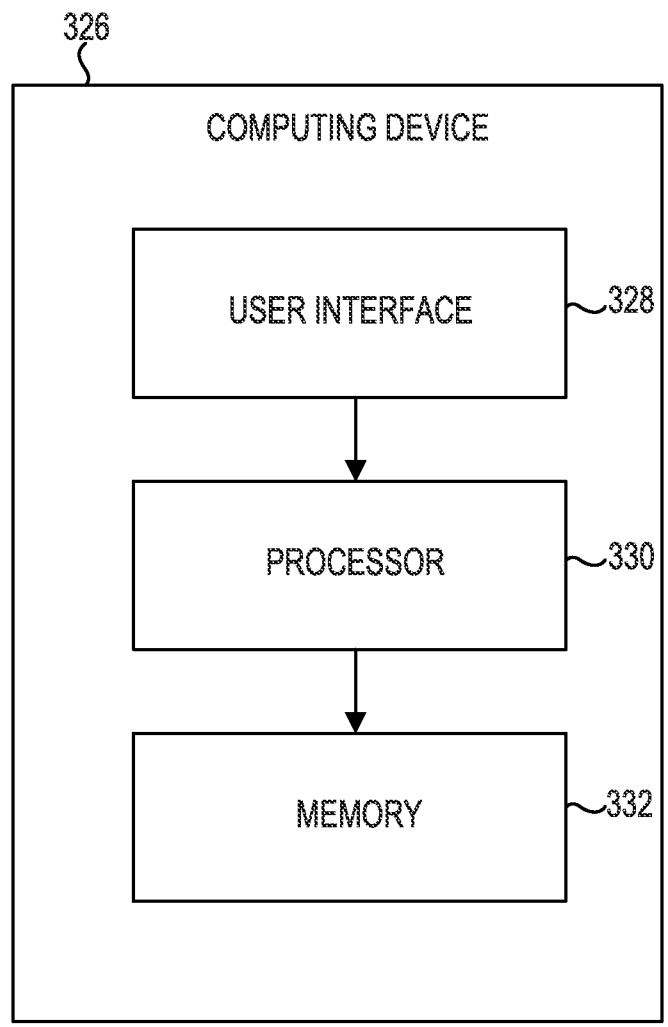
FIG. 3 illustrates a computing device for health monitoring of lights according to one or more embodiments of the present disclosure.

As shown in FIG. 3, computing device 326 includes a processor 330 and a memory 332 coupled to the processor 330. Memory 332 can be volatile or nonvolatile memory. Memory 332 can also be removable (e.g., portable) memory, or non-removable (e.g., internal) memory. For example, memory 332 can be random access memory (RAM) (e.g., dynamic random access memory (DRAM) and/or phase change random access memory (PCRAM)), read-only memory (ROM) (e.g., electrically erasable programmable read-only memory (EEPROM) and/or compact-disk read-only memory (CD-ROM)), flash memory, a laser disk, a digital versatile disk (DVD) or other optical disk storage, and/or a magnetic medium such as magnetic cassettes, tapes, or disks, among other types of memory.

Further, although memory 332 is illustrated as being located in computing device 326, embodiments of the present disclosure are not so limited. For example, memory 332 can also be located internal to another computing resource (e.g., enabling computer readable instructions to be downloaded over the Internet or another wired or wireless connection).

Memory 332 can also store executable instructions, such as, for example, computer readable instructions (e.g., software), for health monitoring of lights in accordance with one or more embodiments of the present disclosure.

Processor 330 can execute the executable instructions stored in memory 332 to receive data, including a junction temperature of a light emitting diode (LED), an ambient temperature of an enclosure containing the LED, a drive current associated with the LED, and photometric data associated with the LED. In an example, the junction temperature of the LED, the ambient temperature of the enclosure containing the LED, the drive current associated with the LED, and the photometric data associated with the LED can be received at a controller associated with the LED and/or can be received at a collection station.

In some embodiments, the controller can be in communication with one or more sensors that detect the junction temperature of the LED, the ambient temperature of the enclosure containing the LED, the drive current associated with the LED, and/or the photometric data associated with the LED. Alternatively, and/or in addition, the controller can be in communication with the LED and/or the collection station. For example, the controller can collect the junction temperature of the LED, the ambient temperature of the enclosure containing the LED, the drive current associated with the LED, and/or the photometric data associated with the LED and send the information to the collection station through a wireless and/or wired connection.

In some embodiments, processor 330 can execute the executable instructions stored in memory 332 to receive a pre-existing LED performance data set. As discussed herein, the pre-existing LED performance data set can be in the form of an LED performance graph and/or the pre-existing LED performance data set can be extracted from the LED performance graph.

In some embodiments, processor 330 can execute the executable instructions stored in memory 332 to determine an LED performance equation from the pre-existing LED performance data set and determine an LED life from the junction temperature of the LED, the ambient temperature of the enclosure containing the LED, and the drive current associated with the LED based on the LED performance equation, as discussed herein. In an example, the instructions can include instructions to determine a polynomial equation for the LED performance equation, as discussed herein. For example, the instructions can include instructions to determine a third order polynomial equation for the LED performance equation.

In some embodiments, processor 330 can execute the executable instructions stored in memory 332 to send a notification when a light intensity of the LED reaches a defined level. In an example the notification can be sent by the controller associated with the LED and received by the collection station.

The notification can be sent when the light intensity (e.g., luminous flux) reaches a threshold value and/or a percentage of an initial light intensity of the LED, for example. In an example, the notification can include an indication that the LED needs to be replaced within a certain time period.

In some embodiments, processor 330 can execute the executable instructions stored in memory 332 to determine an end of life of the LED based on the junction temperature of the LED, the ambient temperature of the enclosure containing the LED, the drive current associated with the LED, the photometric data associated with the LED; and the pre-existing LED performance data set. In an example, the photometric data can include a measurement of luminous flux provided by the LED.

In some embodiments, a correlation can be made between the reduction in a luminous flux associated with the LED and the end of life of the LED. In an example, the correlation can be used to determine an end of life of the LED.

Alternatively, and/or in addition, the correlation between the luminous flux associated with the LED and the end of life of the LED can be used to compare with the end of life of the LED determined from the junction temperature of the LED, the ambient temperature of the enclosure containing the LED, and the drive current and LED life determined from the pre-existing LED performance data set, as discussed herein. In an example, the correlation between the reduction in the luminous flux associated with the LED and the end of life of the LED can be used to determine whether the end of life of the LED determined from the junction temperature of the LED, the ambient temperature of the enclosure containing the LED, and the drive current and LED life determined from the pre-existing LED performance data set is accurate.

In some embodiments, a plurality of LEDs can be placed within an enclosure. As such, challenges can be associated with determining the junction temperature associated with each of the plurality of LEDs because a plurality of junction temperature sensors can be used to measure each of the plurality of junction temperatures.

Some embodiments can include determining an average junction temperature between a group of LEDs in an enclosure. In an example, junction temperature sensors can be placed on a fraction of the LEDs in the group of LEDs. For instance, a temperature sensor can be placed on an LED located in a center of the group of LEDs and on an LED located at a perimeter of the group of LEDs. As such, an average of the temperatures can be taken and used for the determination of the end of life of the group of LEDs.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the disclosure includes any other applications in which the above structures and methods are used. Therefore, the scope of various embodiments of the disclosure should be determined with reference to the appended claims, along with the full range of equivalents to which such claims are entitled.

In the foregoing Detailed Description, various features are grouped together in example embodiments illustrated in the figures for the purpose of streamlining the disclosure. This method of disclosure is not to be interpreted as reflecting an intention that the embodiments of the disclosure require more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A method for health monitoring of lights, comprising:
receiving, at a computing device, actual operating parameter data from at least one sensor associated with an operating light emitting diode (LED), the data including a junction temperature of the LED, an ambient temperature, and a drive current associated with the LED;
receiving, at the computing device, a pre-existing LED performance data set; and
determining, at the computing device, an end of life of the LED based on the junction temperature of the LED, the ambient temperature, the drive current associated with the LED, and the pre-existing LED performance data set; and
initiating, at the computing device, a notification of the end of life at a time prior to the end of life occurring.

2. The method of claim 1, comprising receiving ambient temperature data, wherein the data represents a sensed ambient temperature within an enclosure containing the LED.

3. The method of claim 1, comprising:
receiving photometric data from the LED within an enclosure; and
calculating the end of life of the LED based on the received photometric data.

4. The method of claim 3, comprising receiving the photometric data from a sensor located in the enclosure containing the LED.

5. The method of claim 1, comprising:
determining an LED life from the pre-existing LED performance data set;
determining an LED performance equation from the actual operating parameters and pre-existing LED performance data set; and
determining an LED life from the junction temperature of the LED, the ambient temperature, and the drive current associated with at least one sensor based on the LED performance equation.

6. The method of claim 5, comprising:
determining an end of life of the LED through an end of life equation:

$$L = L_0 - \sum_{J_c, i, T_a} \frac{L_0}{L_{J_c, i, T_a}} t_{J_c, i, T_a},$$

wherein:
L is the end of life of the LED;
$L_0$ is the life of the LED determined from the pre-existing LED performance data set;
$L_{J_c, i, T_a}$ is the life of the LED determined from the junction temperature of the LED, the ambient temperature, and the drive current associated with the LED based on the LED performance equation at; and
$t_{J_c, i, T_a}$ is the actual time elapsed when operating the LED at the junction temperature, the ambient temperature, and the drive current.

7. The method of claim 1, comprising transmitting at least one of the junction temperature of the LED, the ambient temperature, the drive current associated with the LED, the photometric data, and the end of life of the LED to a collection station.

8. The method of claim 7, wherein:
the collection station is mounted on a vehicle; and
the at least one of the junction temperature of the LED, the ambient temperature, the drive current associated with the LED, and the photometric data is transmitted from at least one sensor to the collection station as the collection station passes within a defined range of the LED.

9. The method of claim 7, comprising transmitting the end of life of the LED to a collection station when the end of life reaches one or more defined values.

10. The method of claim 1, comprising:
receiving an instruction to transmit the end of life of the LED at a first controller associated with a first LED;
sending the instruction from the first controller associated with the first LED to a second controller associated with a second LED; and
receiving, at the first controller associated with the first LED, the end of life associated with the second LED.

11. A machine-readable non-transitory medium storing instructions for health monitoring of lights, executable by a machine to cause the machine to:
receive data, at a computing device, including a junction temperature of an operating light emitting diode (LED), an ambient temperature of an enclosure containing the LED, a drive current associated with the LED, and photometric data associated with the LED;
receive a pre-existing LED performance data set, at the computing device;
receive, at the computing device, one or more actual operating parameters from the operating LED; and
determine, at the computing device, an end of life of the LED based on the junction temperature of the LED, the ambient temperature of the enclosure containing the LED, the drive current associated with the LED, the photometric data associated with the LED; and the pre-existing LED performance data set.

12. The machine-readable non-transitory medium of claim 11, wherein the instructions include instructions to:
determine an LED performance equation from the pre-existing LED performance data set and one or more actual operating parameters; and
determine an LED life from the junction temperature of the LED, the ambient temperature of the enclosure containing the LED, and the drive current associated with the LED based on the LED performance equation.

13. The machine-readable non-transitory medium of claim 12, wherein the instructions include instructions to determine a polynomial equation for the LED performance equation.

14. The machine-readable non-transitory medium of claim 11, wherein the instructions include instructions to send a notification when a light intensity of the LED reaches a defined level.

15. The machine-readable non-transitory medium of claim 11, wherein the instructions include instructions to measure an average junction temperature between a group of LEDs in an enclosure.

16. A system for health monitoring of lights, the system comprising a processing resource in communication with a non-transitory computer-readable medium, wherein the computer-readable medium contains a set of instructions and wherein the processing resource is designed to execute the set of instructions, at a computing device, to:
  receive data, including a junction temperature of a light emitting diode (LED), an ambient temperature, and a drive current associated with the LED;
  receive, at the computing device, a pre-existing LED performance data set;
  receive, at the computing device, one or more actual operating parameters;
  determine an LED performance equation from the pre-existing LED performance data at the computing device;
  determine, at the computing device, an LED life from the junction temperature of the LED, the ambient temperature, and the drive current associated with the LED based on the LED performance equation;
  determine, at the computing device, an LED life from the pre-existing LED performance data set; and
  determine, at the computing device, an end of life of the LED based on the LED life determined from the junction temperature, the ambient temperature, and the drive current and LED life determined from the pre-existing LED performance data set.

17. The system of claim 16, wherein the system determines the end of life of the LED based on an actual elapsed time when operating the LED at the junction temperature, the ambient temperature, and the drive current.

18. The system of claim 16, wherein the pre-existing LED performance data set is extracted from an LED performance graph.

19. The system of claim 16, wherein the pre-existing LED performance data is interpolated from the extracted data from the LED performance graph.

20. The system of claim 19, wherein the LED performance equation is a polynomial fit to the interpolated data extracted from the LED performance graph.

* * * * *